United States Patent [19]
Authier

[11] 4,170,985
[45] Oct. 16, 1979

[54] SOLAR ENERGY COLLECTOR

[75] Inventor: Bernard F. Authier, Marseilles, France

[73] Assignee: Agence Nationale de Valorisation de la Recherche (ANVAR), Neuilly-sur-Seine, France

[21] Appl. No.: 828,171

[22] Filed: Aug. 26, 1977

[30] Foreign Application Priority Data

Sep. 20, 1976 [FR] France .................................. 76 28550

[51] Int. Cl.² ................................................ F24J 3/02
[52] U.S. Cl. ...................................... 126/424; 60/641; 126/438
[58] Field of Search ................... 126/270, 271; 60/641; 237/1 A

[56] References Cited

U.S. PATENT DOCUMENTS

| 670,916 | 3/1901 | Eneas | 126/271 |
|---------|--------|-------|---------|
| 2,976,533 | 3/1961 | Salisbury | 126/270 |
| 3,868,823 | 3/1975 | Russell, Jr. et al. | 126/270 |
| 4,027,651 | 6/1977 | Robbins, Jr. | 126/270 |
| 4,065,053 | 12/1977 | Fletcher et al. | 126/271 |

Primary Examiner—Kenneth W. Sprague
Attorney, Agent, or Firm—Lewis H. Eslinger

[57] ABSTRACT

The invention relates to a solar energy collector or cell comprising a fixed spherical mirror placed on the ground by its convex face and a boiler in which circulates a heat-transfer fluid and which is movable about the center of the mirror. The boiler comprises a low concentration boiler surmounted by a high concentration boiler. The spherical mirror has a visor in the form of a spherical sector which moves on the periphery of the mirror.

13 Claims, 8 Drawing Figures

Fig. 4

SOLAR ENERGY COLLECTOR

BACKGROUND AND BRIEF SUMMARY OF THE INVENTION

The present invention relates to solar energy collectors or cells comprising a fixed spherical mirror whose centre is located above the mirror and a boiler which is movable around the centre of the mirror in which circulates a heat-transfer fluid.

One of the objects of the invention is to construct solar collectors having a power of the order of 1 MW which serve to heat a heat-transfer fluid to a temperature of approximately 350° C. in order to provide the steam required for supplying a thermal power station.

Solar energy collectors are already known which have a fixed spherical mirror which rests on the ground via its convex face having a substantially vertical axis at low latitudes or a slightly inclined axis at higher latitudes.

One of the objects of the present invention is to improve this type of collector, more particularly with reference to the boiler so as to be able to collect energy, particularly in the high energy concentration zone adjacent to the paraxial focus.

It is pointed out that the paraxial focus of a spherical mirror is located at a distance between the centre and the surface of the mirror on the axis passing through the centre of the mirror and through the centre of the sun.

Another object of the present invention is to improve the mirror so as to avoid a loss of efficiency when the height of the sun varies, without projecting a shadow onto the mirror and without making it necessary to increase the angular aperture of the mirror.

A collector according to the invention comprises in per se known manner a fixed spherical mirror whose centre is located above the mirror, a radius of curvature R and a paraxial focus; a movable boiler in which circulates a heat-transfer fluid, said boiler having an axis which passes through the centre of the mirror; and means for pivoting the boiler axis around the centre of the mirror, whilst maintaining it directed towards the sun.

The objects of the invention are achieved by means of a collector of the type indicated hereinbefore which has a boiler in the form of two coaxial boilers which rotate about their common axis, namely an elongated low concentration boiler with two axially opposed ends, a lower end located in the vicinity of the mirror surface via which a heat transfer fluid enters and an upper end; and a high concentration boiler which is located in the vicinity of said paraxial focus and which is separated from said upper end of the low concentration boiler by an intermediate space.

The high concentration boiler preferably has the form of a cavity which rotates about the axis common to the two boilers having two axially opposed ends, a lower open end and an upper closed end, said high concentration boiler having a coil in which circulates a heat-transfer fluid, said coil covering the walls of said cavity and has an intake port for the fluid located on the periphery of said lower end and a discharge port for the fluid located in the centre of said upper end.

Preferably the diameter of the lower end of the high concentration boiler is between 0.05 and 0.06 times the radius of curvature R of the mirror and this end is located at a distance from the centre of the mirror which is between 0.54 and 0.57 R.

The low concentration boiler comprises either a coil wound round a coaxial cylinder with the high concentration boiler, or exchanger tubes arranged parallel to the generating lines of a cylinder and to the boiler axis.

A mirror according to the invention comprises in per se known manner a spherical reflecting cap, whose convex portion is placed on the ground.

The second object of the invention is achieved by means of a movable visor constituted by a reflecting spherical sector which extends said cap over a portion of the periphery and by means for rotating said visor around the cap axis in such a way that the boiler is constantly in the plane of symmetry of the visor.

Preferably in a plane perpendicular to the axis of the cap the visor has an angular aperture between 90° and 120° and in a meridian plane passing through said axis an angular aperture between 10° and 25°.

The result of the invention is a novel product constituting a solar energy collector or cell which makes it possible to heat a heat-transfer fluid to a temperature between 100° and 500° C. and consequently produce the steam making it possible to drive a turbine coupled to an a.c. generator.

For example a collector according to the invention having a mirror whose radius of curvature is of the order of 25 m and a semiapertural angle of 60° has a reflecting surface of 3,000 m$^2$ and makes it possible to collect a thermal power on the boiler of the order of several megawatts.

An advantage of the collectors according to the invention is that they permit a relatively high energy concentration onto boilers with a limited surface area, whilst obtaining high temperatures with a high efficiency. The special construction of the present boiler with a first low concentration boiler followed by a second high concentration boiler which is separated from the former makes it possible to pre-heat the heat-transfer fluid to a temperature of approximately 250° C., prior to optionally passing it into the high concentration boiler in order to raise the final temperature to approximately 350° C., or alternatively it can be used separately.

The rotary visor makes it possible to increase the quantity of energy reflected onto the boiler when the height of the sun decreases without there being any danger of creating a shadow which is directed onto the mirror. Thus, it is possible, even outside equatorial zones to construct mirrors with a vertical axis which can be more easily placed on the ground, whilst retaining a good useful reflecting surface.

BRIEF DESCRIPTION OF THE DRAWINGS

An embodiment of the collector according to the invention is described in an illustrative and non-limitative manner hereinafter with reference to the attached drawings, wherein show.

DETAILED DESCRIPTION OF THE PREFERRED EMBODIMENTS

Figure 1:
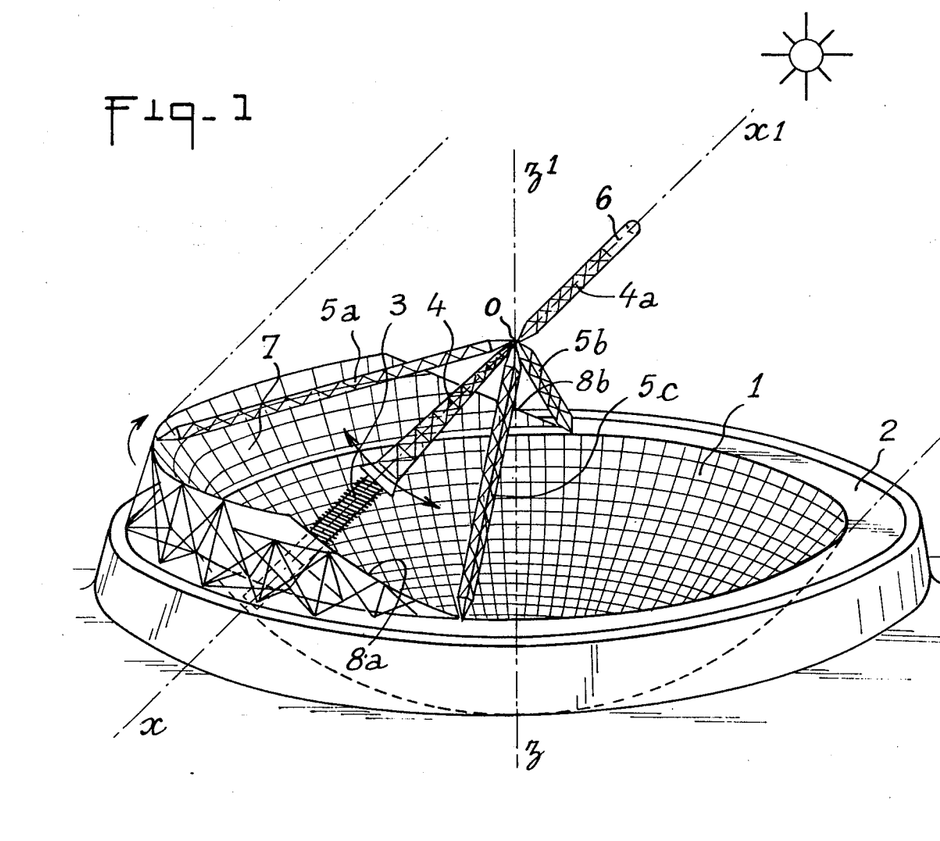
FIG. 1. An overall perspective view of a collector according to the invention.

FIG. 1 shows a solar energy collector comprising a fixed spherical mirror 1 in the form of a spherical cap with a centre O and a vertical axis z z1. The convex face of the mirror is supported by a solid or rigid structure 2 placed on the ground and partly buried therein in such a way that the reflecting surface is rotated upwards. This reflecting surface has a semiapertural angle of approximately $\omega = 60°$. This is the maximum aperture enabling all the solar rays parallel to the axis of the mirror to intersect said axis after a single reflection on the mirror. The radius of curvature R of the mirror is for example of the order of 25 m, the aperture diameter of the mirror D then being 40 m, corresponding to a reflecting surface of approximately 3,000 m$^2$ and a collected thermal power of about one megawatt, so that such a collector can be used for example to produce the steam permitting the operation of an electric power station able to supply electric power to a town located in the vicinity of the equator or in a tropical area.

The collector according to the invention also comprises a boiler 3 with an axis x x1 passing through the centre O of the mirror. The collector also has means for constantly maintaining axis x x1 in the direction of the sun.

In the present embodiment boiler 3 is placed at the end of an arm 4 which is itself supported by feet 5, for example three feet 5a, 5b and 5c which converge at the centre O of the spherical cap 1. At this point arm 4 is articulated relative to tripod 5a, 5b, 5c. For example arm 4 is supported by a universal joint or ball and socket joint permitting the pivoting of arm 4 in accordance with two orthogonal axes to ensure that it follows the movement of the sun.

Advantageously arm 4 has an extension 4a extending beyond centre O in order to balance the mass of the boiler and the force of the wind on arms 4 and 4a, thus preventing untimely pivoting actions of arm 4 about centre O under the action of the wind and an alignment defect of axis x x1 relative to the direction of the sun.

Arm 4a advantageously has at its end a photosensitive device 6, for example three photoelectric cells arranged in star-like manner at 120° from one another and which automatically control servo-motors responsible for the displacements of arm 4, in such a way that the lighting of the three cells is identical, that is to say the sun remains in the alignment of arms 4 and 4a.

The collector according to the invention shown in FIG. 1 also has a movable visor 7, constituted by a spherical reflecting sector of centre O and of the same radius as cap 1, which extends the latter over part of the periphery. It also has means for rotating visor 7 about axis z z1 in such a way that the boiler remains constantly in the vertical plane of symmetry of said visor, that is to say the visor is constantly symmetrical relative to the plane defined by axis z z1 and x x1 in which the sun is located, whereby the visor is obviously located on that side of the centre O which is opposite to the sun. The function of the movable visor is to directly reflect onto the boiler the solar rays which strike it when the height h of the sun decreases, either during its diurnal movement, or as a function of the latitude, making it possible to retain a mirror of vertical axis z z1 which is easier to construct. As the visor is always oppositely located relative to the sun it can never project a shadow onto the surface of the mirror.

In a plane perpendicular to axis z z1, that is to say in a plane which is horizontal in the drawing visor 7 has an angular aperture between 90° and 120°. Advantageously said angular aperture decreases on moving away from the lower edge of the cap, as shown in FIG. 1, in such a way that the lateral edges 8a, 8b of the visor are not vertical but inclined.

In the meridian planes passing through axis z z1 visor 7 has an angular aperture $\gamma$ between 10° and 30°.

In the embodiment shown in FIG. 1 tripod 5a, 5b, 5c is fixed to the visor 7 and is rotated with the latter about axis z z1 in a uniform hourly movement, following the displacements of the sun in azimuth. In this case it is merely necessary for arm 4 to be articulated relative to tripod 5a, 5b, 5c about an axis perpendicular to the plane of symmetry of the visor in order to follow the movements of the sun in situ.

Figure 2:
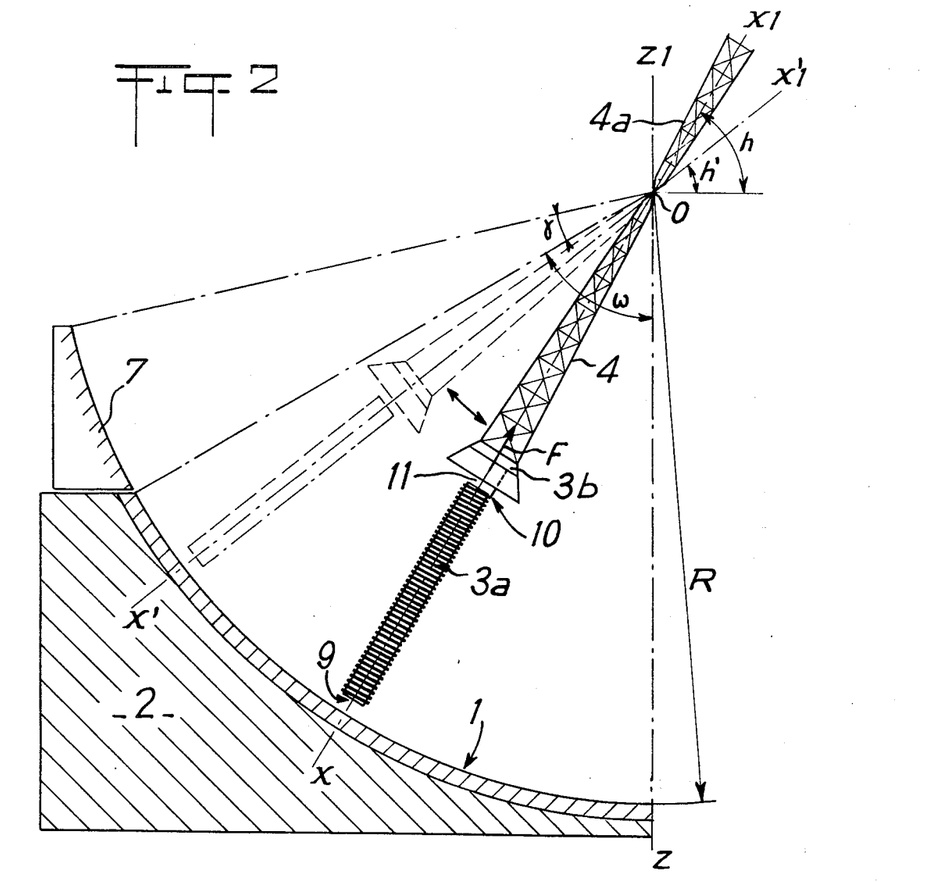
FIG. 2. A view of FIG. 1 in the vertical half-sectional form passing through the boiler axis.

FIG. 2 is a vertical half section of FIG. 1 passing through the plane of symmetry of visor 7 in which is contained axis x x1 of the boiler, said plane pivoting about axis z z1 in order to follow the displacement in azimuth of the sun in such a way that the sun remains constantly in this plane during the day. This drawing shows spherical cap 1 of axis z z1, of centre O, and angle $\omega = 60°$ and radius of curvature R as well as the vertical section of the movable visor 7 extending said cap 1 and whose angular aperture $\gamma$ in the vertical plane is shown. It is also possible to see arms 4 and 4a of axis x x1 articulated at O about an axis perpendicular to the plane of the drawing in order to follow the in situ displacements of the sun. Continuous lines have been used to show the position of the axis x x1 for a height h of the sun and dotted lines to show the position x' x'1 for a height h' of the sun.

FIG. 2 shows on a larger scale the construction of boiler 3, which comprises a low concentration boiler 3a and a high concentration boiler 3b in which there is a successive circulation of a heat-transfer fluid in this particular embodiment. The heat-transfer fluid enters boiler 3a by end 9 located on the mirror side and leaves therefrom by the opposite end 10 and then enters the high concentration boiler.

The two boilers are separated by an intermediate space 11 in such a way that boiler 3a intercepts to the least possible extent the rays reflected by the mirror which strike boiler 3b.

Boiler 3b has the general shape of a disc 14 perpendicular to axis x x1. The front face of boiler 3b, i.e. face 14a which is turned towards the mirror, which receives the reflected light rays, is located slightly below the paraxial focus F of the spherical mirror, that is to say the distance between the mirror centre O and the front face 14a is slightly greater than half the R.

Figure 3:
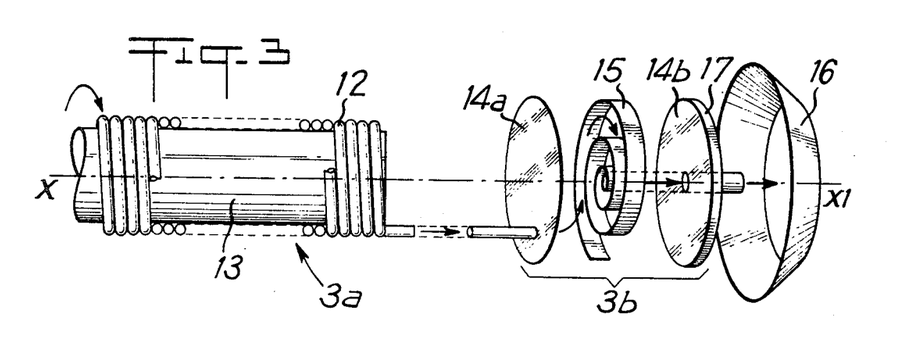
FIGS. 3, 6, 7 and 8. Views of the high concentration boiler.

FIG. 3 shows on a larger scale an exploded perspective view of boilers 3a and 3b.

In this embodiment boiler 3a comprises a coil 12 wound with contiguous turns around a cylinder 13 or a truncated cone of axis x, x1. Obviously cylinder 13 may or may not be materialised. The heat-transfer fluid circulates in the coil in the direction indicated by the arrows.

As a variant boiler 3a can comprise a bundle of exchanger tubes juxtaposed in accordance with the generating lines of a cylinder or a truncated cone 13 of axis x x1 and joined to an upstream manifold and a downstream manifold by valves which make it possible to control the circulation in certain tubes which are little illuminated when the height of the sun drops in such a way that the heat-transfer fluid flow rate decreases and the fluid preheating temperature remains substantially constant.

The high concentration boiler 3b shown in FIG. 3 comprises two discs 14a, 14b perpendicular to axis x x1 and centred on the latter. The two discs are interconnected by one or several partitions 15 spirally wound around axis x x1. The fluid from boiler 3a enters on the periphery of the spiral and leaves at its centre, as indicated by the arrows, making it possible to reach a high discharge temperature of the order of 350° C., because the centre is the zone of maximum concentration of solar light.

The drawing shows the case where only one partition is used. In the case where several partitions are used, the latter are wound in parallel spirals and the heat-transfer fluid circulates in parallel in said spirals making it possible to reduce the fluid velocity for the same total flow.

As a variant the two discs 14a, 14b and partition 15 can be replaced by a coil formed by one or several tubes, preferably with a rectangular cross-section, which are wound spirally and with contiguous turns around axis x x1.

The front face 14a of the high concentration boiler receives reflected solar rays by aspherical cap centred on the boiler axis. A cap having a semiapertural angle $\omega'$ of the order of 28° is chosen, corresponding to a percentage of the total reflecting section equal to 30%. The position and diameter of disc 14a are chosen in such a way that the energy concentration received per surface unit is equal to 300, leading to a diameter between 0.05R and 0.06R and preferably equal to 0.056R. Disc 14a is located slightly below the plane of the circle of least diffusion of solar rays, i.e. at a distance from the mirror centre between 0.54 and 0.57R.

The heat-transfer fluid is, for example, hydrogenated terphenyl, whose boiling temperature exceeds 350° C. and which has a high specific heat.

FIG. 3 also shows a truncated cone-shaped reflector 16 which surrounds the high concentration boiler, said reflector diverging towards the mirror. This reflector opposes the ascending convection currents and limits the convection losses. It reflects back to the low concentration boiler the few light rays which escape from the high concentration boiler.

The rear face of the boiler is thermally insulated by a layer 17. The front face 14a is treated in order to increase the absorption coefficient.

Figure 4:
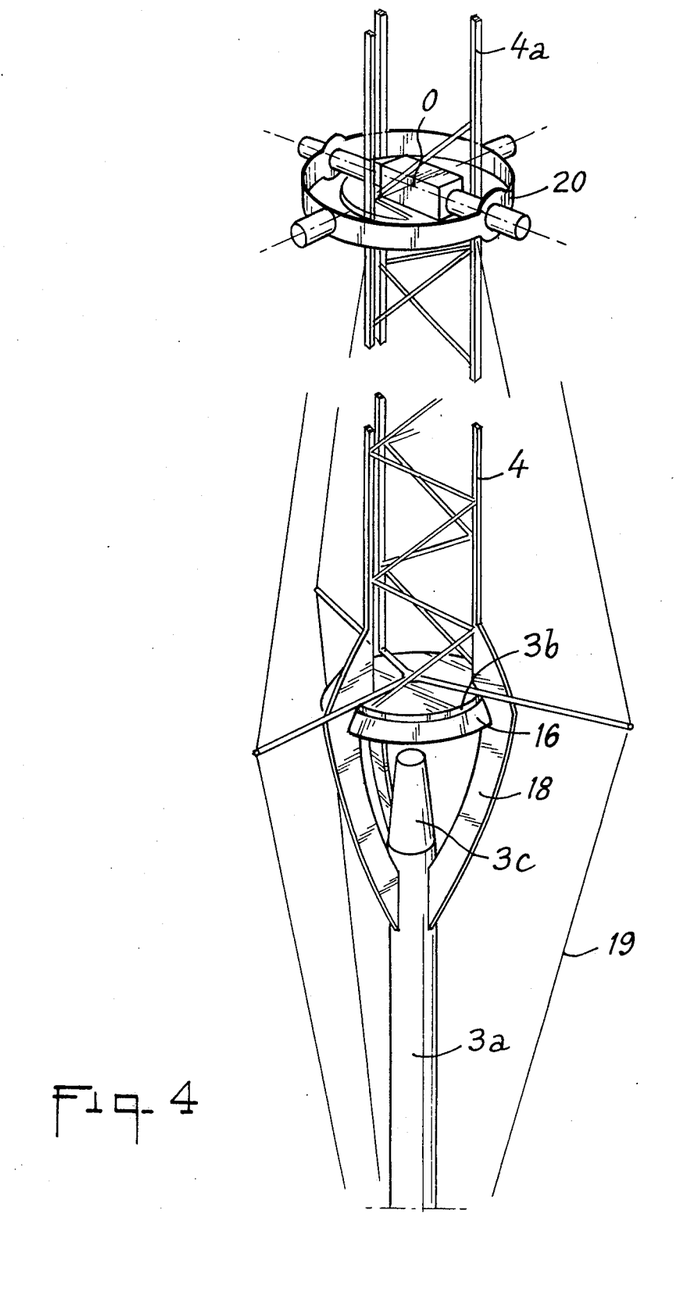
FIG. 4. A perspective view of the boiler and the arm supporting the same.

FIG. 4 is a part perspective view of a practical embodiment of the boiler and the articulated arm 4. In this drawing the rear end 3c of the low concentration boiler 3a is truncated cone-shaped to permit an easier passage of the rays reflected towards the high concentration boiler 3b surrounded by a reflector 16. It is also possible to see arm 4 formed by a trellis structure.

The low concentration boiler 3a is fixed to the arm 4 by its rear end by means of three flat brackets 18, which are thermally insulated and located in axial planes passing through the boiler axis, in such a way that the shadow cast by these brackets is reduced. It is also fixed by stays 19 which are fixed to the front end of the boiler located in the vicinity of the mirror surface.

Arm 4 and its extension 4a are supported by a universal or ball and socket joint 20, whose two rotation axes meet at centre O of the mirror. Advantageously one of the two axes is parallel to the celestial axis and the ball and socket joint is rotated at uniform hourly speed about said axis in order to follow the movement of the sun. The other axis can be immobilised during the day and it is merely necessary to manually pivot the ball and socket joint between two working days about the second axis. This solution has the advantage that it is no longer necessary for the orientation of the boiler axis to be dependent on the direction of the sun and it is merely necessary to use a synchronous speed motor controlled by a clock for effecting the rotation about the axis parallel to the celestial axis. It is also possible to use a drive device, identical to that of astronomical instruments with a parallactic mounting.

Obviously the universal joint 20 can be replaced by any equivalent means permitting an orientation about two perpendicular axes, for example ball joints.

Figure 5:
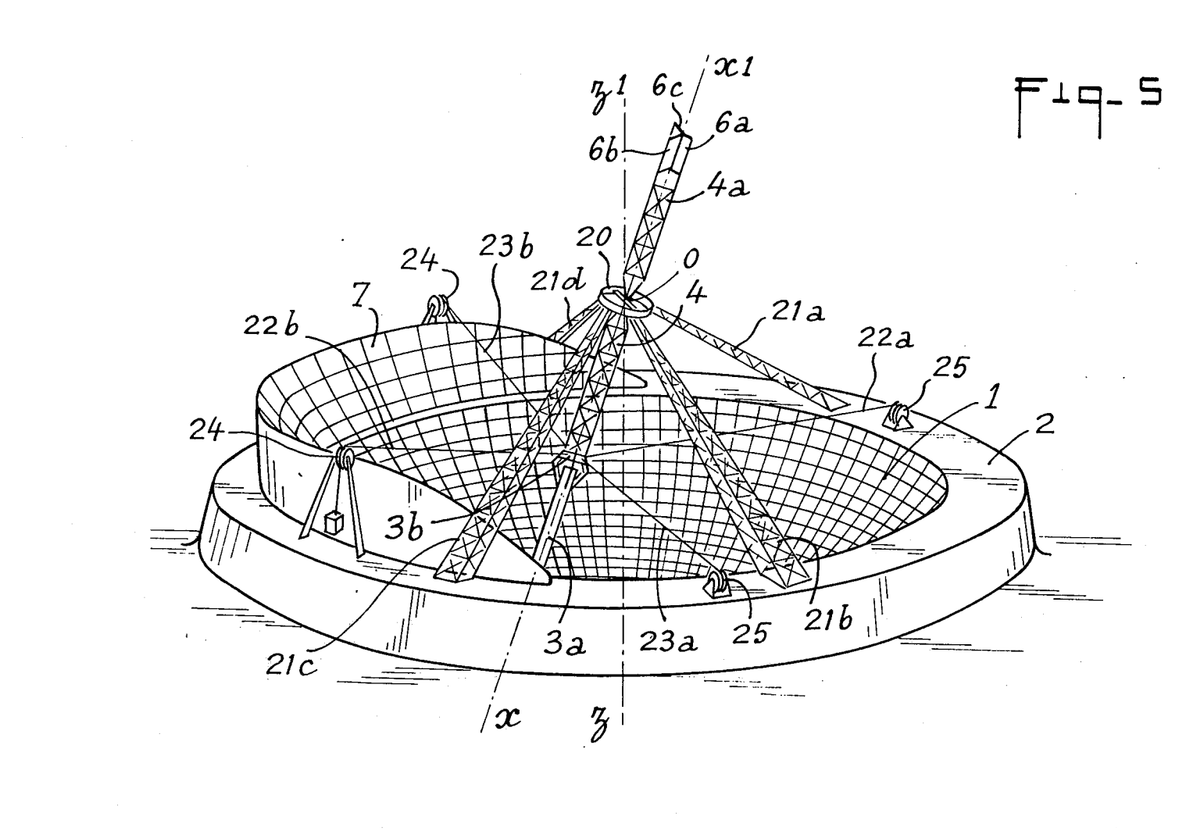
FIG. 5. An overall perspective view of a second embodiment.

FIG. 5 is an overall view, identical to FIG. 1, of another embodiment. Identical parts are given the same reference numerals. This embodiment differs from that of FIG. 1 due to the fact that the support of the boiler comprises four feet 21a, 21b, 21c and 21d which are fixed and support the universal joint 20, which carries arm 4 and its extension 4a. The two axes of the universal joint have a random orientation.

The front end of arm 4 is attached to two pairs of pairwise diametrically opposed cables, namely pair 22a, 22b and pair 23a, 23b.

Cables 22b and 23b pass over a pulley 24 and a counterweight is fixed to the end thereof.

Cables 22a and 23a pass over motorised winches 25 and are provided with counterweights.

Arm 4a carries photoelectric pick-ups 6, for example three photoresistors 6a, 6b, 6c arranged in star-like manner about axis x x1 and which are inserted pairwise in resistance bridges and the differential current in each of the bridges automatically controls one of the two motors of winches 25 which automatically displace arm 4 in such a way that the lighting of the three cells remains equal, that is to say axis x x1 is constantly directed towards the sun.

Spherical mirror 1 and visor 7 comprise juxtaposed panels, for example 25 m² spherical panels which can be manipulated with conventional handling means. These panels can be made from glass with a reflecting coating or from a polished metal, whereby a reflecting film coating is provided. Each panel can comprise several identical elementary mirrors which are assembled in the factory, whilst the panels are assembled on the site, each panel being supported by three regulatable points.

Figure 6:
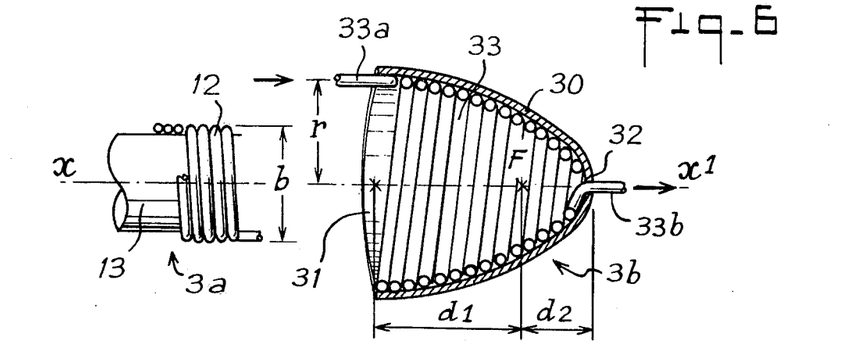

FIG. 6 shows a view identical to that of FIG. 3 of a variant of the high concentration boiler 3b.

In this drawing the low concentration boiler 3a comprises a coil 12 wound onto a cylinder 13. The diameter b of the cylinder is for example of the order of $23 \cdot 10^{-3} \cdot R$, R being the radius of the mirror.

In this variant the high concentration boiler 3b comprises a hollow body 30 which defines a cavity rotating about axis x x1 which is common to both boilers. Body 30a has a front or lower open end 31, which is located below the paraxial focus F and which is rotated towards the mirror in such a way that a large proportion of the rays reflected by the mirror and focused around paraxial focus F penetrate the cavity via the opening 31 of radius r. Cavity 30 in FIG. 6 has an ogival shape, whose apex 32 is directed towards the centre of the mirror and is located between the paraxial focus F and the centre of the mirror.

Radius r is for example equal to $28 \cdot 10^{-3} R$. Distance d1 between opening 31 and paraxial focus F is equal to $55 \cdot 10^{-3} R$ and the distance d2 between paraxial focus F and apex 32 is equal to 20·10$^{-3}$R. Obviously these values can vary slightly.

In all cases the ratio between diameter 2r of opening 31 and diameter b of the low concentration boiler must be between 2 and 4 and preferably close to 3. In the same way the ratio between the total height d1+d2 of the high concentration boiler and the radius r of opening 31 is between 2 and 4 and is preferably 3. Distance d1 and diameter 2r are of the same order of magnitude and distance d2 is substantially equal to r. Diameter 2r is between 0.05 R and 0.06 R and distance d1 is preferably between 0.04 R and 0.07 R.

In the embodiment shown in FIG. 6 body 30 is internally covered by a coil 33 which is wound spirally with contiguous turns. A heat-transfer fluid circulates within coil 33. It enters the latter via an inlet pipe 33a located on the side of the mirror and leaves it by a discharge pipe 33b located at the apex 32 or in the vicinity of the latter.

The heat-transfer fluid which enters pipe 33a can be a fluid coming from low concentration boiler 3a in which it has been preheated. It is also possible to use separately in two different circuits the fluid coming from the low concentration boiler 3a at a temperature of approximately 200° C. and the fluid from the high concentration boiler 3b at a temperature of approximately 350° C.

Figure 7:
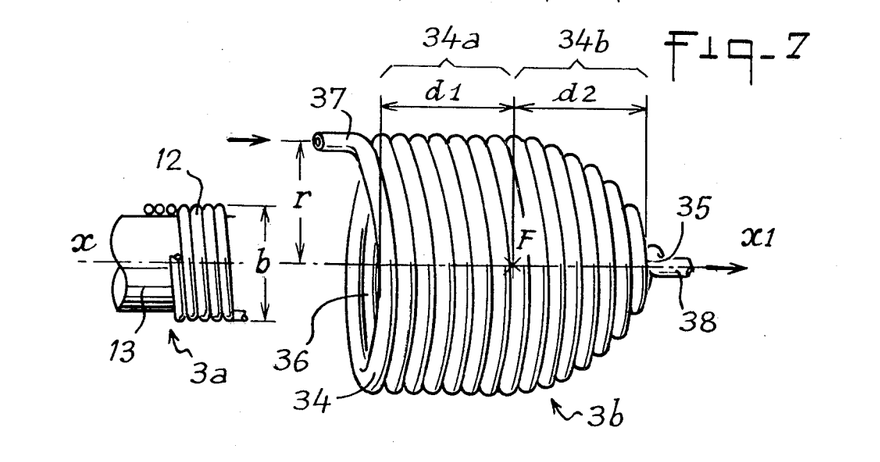

FIG. 7 shows a perspective view of another variant of the high concentration boiler 3b. In this variant boiler 3b solely comprises a coil 34 with contiguous turns which is first helically in portion 34a located below the paraxial focus F and then spirally in the portion 34b located above said focus.

Portion 34a defines a cylindrical cavity of axis x x1 and portion 34b defines a conical cavity which rotates about axis x x1 having an apex 35 on said axis between paraxial focus F and the centre of the mirror. The junction between the cylindrical portion and the concave portion is located substantially at the height of focus F. The relative values of b, r, d1 and d2 are the same as those of the variant of FIG. 6.

The system of portions 34a and 34b of the coil defines a cavity whose front end 36 is open and whose rear end is closed. The heat-transfer fluid enters the coil by an intake pipe 37 which is connected to the first loop of the coil located about the open end 36 and leaves it by a discharge pipe 38 located at the apex 35 or in the vicinity of the latter.

Figure 8:
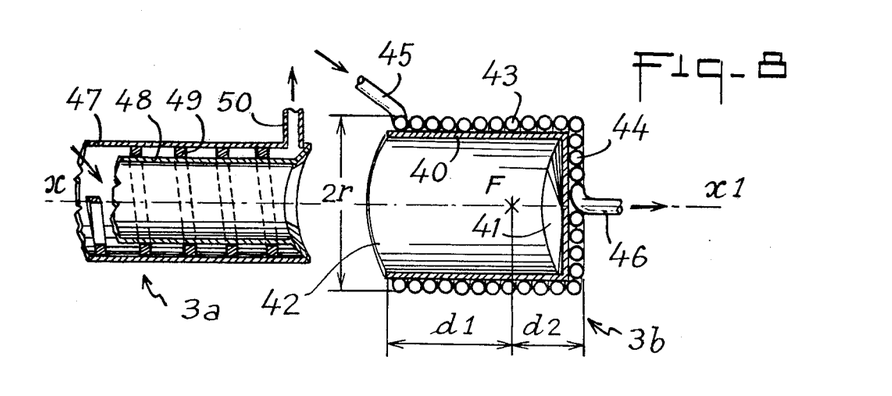

FIG. 8 shows a third embodiment of the high and low concentration boilers. In this embodiment the high concentration boiler 3a comprises a hollow cylindrical body 40 of axis x x1, having a closed upper end 41 and an open lower end 42. Body 40 is made from a good heat conducting metal.

It is surrounded by a coil 43 which is helically wound around the cylindrical wall and which is extended by a coil 44 which is spirally wound with contiguous turns and which covers the outer face of end 41. The heat-transfer fluid enters the coil by a pipe 45 which is connected to the periphery of opening 42 and leaves by a pipe 46 which is connected to the centre of spiral 44.

It is pointed out that it is also possible to place a coil at the end of an ogival enclosure, like enclosure 30 or alternatively a coil 43 can be placed within a cylindrical enclosure 40.

The feature common to all the cases is that the high concentration boiler has the form of an enclosure which rotates about an axis common to the two boilers. Said enclosure being open at the lower end and closed at the upper end by a member which is preferably concave, whose apex is directed upwards and the side walls as well as the base of the enclosure are internally or externally covered by a coil in which circulates a heat-transfer fluid which enters by the lower open end and which leaves at the centre of the upper end.

The cavity-like configuration of the high concentration boiler which envelops the paraxial focus makes it possible to prevent the coil being placed in contact with the dart-shaped high energy concentration zone which is located around the paraxial focus.

FIG. 8 shows a variant of the low concentration boiler 3a. It is pointed out that said variant can also be used in association with the high concentration boilers shown in FIGS. 3, 6 and 7.

In this variant boiler 3a comprises two coaxial tubes 47, 48 which define an annular space in which is placed a helically wound wire 49 of square cross-section in such a way that the two tubes and the wire define a coil, whose pitch can vary widely and in which circulates a heat-transfer fluid which enters by the end located on the mirror side and which leaves by a discharge pipe 50.

Such a coil can be produced by hooping. In this case wire 49 is helically wound onto tube 48 and is fixed to the latter for example by welding. Tube 49 is then cooled, for example by filling it with liquid nitrogen. Finally tube 47 is heated before engaging it around the cooled tube 48 carrying wire 49. When the two tubes 47 and 48 return to ambient temperature wire 49 is greatly radially compressed between the two tubes. Wire 49 preferably has a square cross-section.

The invention is not limited to the embodiments described and represented hereinbefore and various modifications can be made thereto without passing beyond the scope of the invention.

What is claimed is:

1. A solar energy collector comprising a fixed spherical mirror having a reflective surface, a center located above the mirror, a radius of curvature R and a paraxial focus located on the movable axis which passes through said center of the mirror and through the center of the sun; a pair of movable boilers having a common axis passing through said mirror center and being spaced from one another along said common axis a predetermined distance, a heat-transfer fluid conduit means for defining a flow path in which said heat-transfer fluid may circulate through each boiler, and means for pivoting said common axis about said mirror center to maintain said common axis directed towards the sun; said boilers respectively comprising a low concentration boiler, elongated along said common axis, and having two axially opposite ends including a lower end, located in the vicinity of said reflective surface, and an upper end; and a high concentration boiler located in the vicinity of said paraxial focus and spaced from the upper end of the said low concentration boiler by said predetermined distance.

2. A collector as claimed in claim 1, wherein said high concentration boiler has the shape of a cavity which is concentric with said common axis and two axially opposite ends comprising a lower open end and an upper closed end, said conduit means in said high concentration boiler including a coil in which circulates said heat-transfer fluid, said coil covering the walls of said cavity and having an intake port for the fluid located on the periphery of said lower end and a discharge port for the fluid located in the center of said upper end.

3. A collector as claimed in claim 1, wherein said high concentration boiler comprises a metallic hollow body which is concentric with said common axis, said high concentration boiler having two axially opposite ends, namely a lower open end and an upper end, side walls extending therebetween and a base member closing said upper end and having a concave shape whose apex is directed towards said mirror center, said conduit means in said high-concentration boiler comprising a coil which covers the side walls and base of said body.

4. A collector as defined in claim 1, wherein said high concentration boiler comprises two spaced metal discs which are perpendicular to said common axis and at least one partition spirally wound around said axis in the space between the discs.

5. A collector as claimed in claim 2, wherein the diameter of the lower end of said high concentration boiler is between 0.05 and 0.06 times the said radius of curvature R and said lower end is located at a distance from the mirror center which is between 0.54 and 0.57 R.

6. A collector as claimed in claim 2, wherein the ratio between the depth of said cavity and the radius r of said lower open end is between 2 and 4.

7. A collector as claimed in claim 1, wherein said conduit means in said low concentration boiler comprises a coil wound helically with substantially contiguous turns.

8. A collector as claimed in claim 1, wherein said conduit means in said low concentration boiler comprises two coaxial tubes which are coaxial and of different internal diameter defining an annular space therebetween and axially aligned with said high concentration boiler and a wire with a square cross-section helically wound in the annular space between the two tubes.

9. A collector as claimed in claim 7, wherein the ratio between the diameter 2r of said lower end of the high concentration boiler and the diameter b of the low concentration boiler is between 2 and 4.

10. A solar energy collector as claimed in claim 1, wherein said spherical mirror is in the form of a spherical cap whose convex portion is placed on the ground and includes a movable visor comprising a reflecting spheric section having a center which coincides with the said center of the mirror and which has the same radius R, said sector extending said cap in the upward direction over only part of the periphery of the mirror and means for rotating said visor about the axis of the cap.

11. A collector as claimed in claim 10, wherein said visor has, in the planes perpendicular to the axis of the cap, an angular aperture between 90° and 120° and in the meridian planes, passing through said axis, an angular aperture between 10° and 30°.

12. A collector as claimed in claim 1, including a movable arm on which said boilers are mounted, at least three fixed feet converging at upper ends at said center of the mirror; and a universal joint operatively mounting said arm at the upper end of said feet at the center of the mirror.

13. A collector as claimed in claim 12, wherein the movable arm has two axially opposite ends including an upper end connected to said universal joint and a lower end, the high concentration boiler being fixed directly to said lower end, flat brackets connecting the lower end of said arm to the upper end of said low concentration boiler and a plurality of stays connecting the lower end of said arm to the lower end of said low concentration boiler.

* * * * *